(12) United States Patent
Nagasaka et al.

(10) Patent No.: US 9,044,856 B2
(45) Date of Patent: Jun. 2, 2015

(54) ROBOT APPARATUS, METHOD OF CONTROLLING THE SAME, AND COMPUTER PROGRAM

(71) Applicant: Sony Corporation, Tokyo (JP)

(72) Inventors: Kenichiro Nagasaka, Tokyo (JP); Takashi Kito, Kanagawa (JP); Hirokazu Shirado, Kanagawa (JP); Atsushi Miyamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 235 days.

(21) Appl. No.: 13/680,501

(22) Filed: Nov. 19, 2012

(65) Prior Publication Data

US 2013/0138244 A1    May 30, 2013

(30) Foreign Application Priority Data

Nov. 30, 2011    (JP) .................................. 2011-262202

(51) Int. Cl.
*G05B 15/00*    (2006.01)
*B25J 9/00*    (2006.01)
*B25J 9/16*    (2006.01)

(52) U.S. Cl.
CPC .............. *B25J 9/0087* (2013.01); *B25J 9/1612* (2013.01)

(58) Field of Classification Search
CPC .......... B25J 9/1612; B25J 9/1638; B25J 1/00; B25J 9/0087; B25J 9/1669; G05B 2219/39543; G05B 2219/39113; G05B 2219/39473; G05B 2219/39474; G05B 2219/39542; G06N 3/008

USPC ................ 700/245, 254, 258, 260, 261, 263; 901/1, 2, 7, 8, 9, 19, 20, 30, 31, 46
See application file for complete search history.

(56) References Cited

U.S. PATENT DOCUMENTS

| | | | |
|---|---|---|---|
| 7,415,321 B2* | 8/2008 | Okazaki et al. ............... | 700/245 |
| 2006/0184272 A1* | 8/2006 | Okazaki et al. ............... | 700/245 |
| 2007/0219668 A1* | 9/2007 | Takahashi et al. ............ | 700/249 |
| 2007/0239315 A1* | 10/2007 | Sato et al. ..................... | 700/245 |
| 2011/0166709 A1* | 7/2011 | Kim et al. ..................... | 700/260 |
| 2011/0238213 A1* | 9/2011 | Nagasaka et al. ............. | 700/253 |
| 2012/0072022 A1* | 3/2012 | Kim et al. ..................... | 700/255 |
| 2012/0078419 A1* | 3/2012 | Kim et al. ..................... | 700/255 |
| 2012/0158174 A1* | 6/2012 | Moon et al. ................... | 700/245 |
| 2013/0054030 A1* | 2/2013 | Murakami ..................... | 700/259 |

FOREIGN PATENT DOCUMENTS

| | | | |
|---|---|---|---|
| JP | 2006-167902 A | | 6/2006 |
| JP | 2006167902 A | * | 6/2006 |
| JP | 2008-541990 A | | 11/2008 |

\* cited by examiner

*Primary Examiner* — Khoi Tran
*Assistant Examiner* — Jorge Peche
(74) *Attorney, Agent, or Firm* — Hazuki International, LLC (57) ABSTRACT

A robot apparatus includes a plurality of arm sections; a grasping-easiness calculation section configured to calculate an index value of grasping easiness quantitatively evaluating easiness of assuming a grasping posture for grasping an object or assuming a transition posture leading to the grasping posture for each of the plurality of arm sections; and an arm-section selection section configured to select an arm section to be used for actually grasping the object on the basis of the index value of the grasping easiness calculated for each of the arm sections.

10 Claims, 6 Drawing Sheets

FIG. 6

ROBOT APPARATUS, METHOD OF CONTROLLING THE SAME, AND COMPUTER PROGRAM

BACKGROUND

The technique disclosed in this specification relates to a robot apparatus provided with a plurality of arm sections, a method of controlling the robot apparatus, and a computer program. More particularly, this technique relates to a robot apparatus for carrying out work using any one of arm sections in accordance with a situation in a surrounding environment that is dynamically changing every moment, a method of controlling the robot apparatus, and a computer program.

A large number of arms are operated in a factory at the same time. In general, tasks to be performed by each arm are determined in advance, and an arm and corresponding tasks to be performed by that arm are fixedly designed.

In contrast, it is assumed that a life support robot is engaged in activities in our daily life. A surrounding environment in which the robot operates is dynamically changing every moment, and thus it is necessary for the robot to determine which of the arms is used in accordance with a situation in order to carry out work. That is to say, a task to be performed by each arm of a life support robot is not determined in advance, and thus it is not possible to fixedly design tasks to be performed by each arm.

For example, when operating an object with two arms, a proposal has been made of a dual arm robot that uses an arm which is near to that object (for example, refer to Japanese Unexamined Patent Application Publication No. 2006-167902). However, there are cases where an object is easily grasped by an arm that is located farther than an arm that is located nearer depending on a posture of an object to be grasped, and a positional relationship with surrounding environmental objects. It is thought that a strategy of using an arm that is nearer to an object to be grasped is used only in a limited situation in which posture of the object to be grasped is fixed, and there is no obstacle.

In a medical field, etc., a robot provided with three arms or more has been introduced (for example, refer to Japanese Unexamined Patent Application Publication (Translation of PCT Application) No. 2008-541990). It is predicted that a question as to which of the arms is used for operation among a plurality of arms will become important all the more when there is an object in various circumstances with an increase in the number of arms.

SUMMARY

It is desirable to provide an excellent robot apparatus provided with a plurality of arm sections and capable of suitably carrying out work using any one of the arm sections in accordance with a situation in a surrounding environment that is dynamically changing every moment, a method of controlling the robot apparatus, and a computer program.

It is further desirable to provide an excellent robot apparatus capable of suitably determining which of a plurality of arm sections is used for operation in more various circumstances when there is an object, a method of controlling the robot apparatus, and a computer program.

According to an embodiment of the present disclosure, there is provided a robot apparatus including: a plurality of arm sections; a grasping-easiness calculation section configured to calculate an index value of grasping easiness quantitatively evaluating easiness of assuming a grasping posture for grasping an object or assuming a transition posture leading to the grasping posture for each of the plurality of arm sections; and an arm-section selection section configured to select an arm section to be used for actually grasping the object on the basis of the index value of the grasping easiness calculated for each of the arm sections.

The above-described embodiment further includes: a grasping planning section configured to determine a grasping point at the time of grasping the object with an arm section and a hand position posture at the time of grasping the object at the grasping point for each of the arm sections; and an arm-section posture determination section configured to determine a posture of the arm section with respect to the determined hand position posture, wherein the grasping-easiness calculation section may quantitatively evaluate easiness of assuming a posture determined by the arm-section posture determination section.

In the above-described embodiment, the grasping-easiness calculation section may calculate the index value of the grasping easiness on the basis of manipulability of the arm section in a grasping posture for grasping the object or a transition posture leading to the grasping posture for each of the plurality of arm sections.

In the above-described embodiment, the grasping-easiness calculation section may calculate the index value of the grasping easiness on the basis of a joint distance from a joint range-of-motion limit of a joint of the arm section in a grasping posture for grasping the object or a transition posture leading to the grasping posture for each of the plurality of arm sections.

In the above-described embodiment, the grasping-easiness calculation section may calculate the index value of the grasping easiness on the basis of shortest distances between the arm section and a surrounding environment, and the arm section and an own body in a grasping posture for grasping the object or a transition posture leading to the grasping posture for each of the plurality of arm sections.

In the above-described embodiment, the grasping-easiness calculation section may calculate the index value of the grasping easiness on the basis of a combination of at least two of manipulability of the arm section, a joint range-of-motion limit of a joint of the arm section, and shortest distances between the arm section and a surrounding environment, and the arm section and an own body in a grasping posture for grasping the object or a transition posture leading to the grasping posture for each of the plurality of arm sections.

According to another embodiment of the present disclosure, there is provided a method of controlling a robot, the method including: grasping-easiness calculating for calculating an index value of grasping easiness quantitatively evaluating easiness of assuming a grasping posture for grasping an object or assuming a transition posture leading to the grasping posture for each of a plurality of arm sections; and an arm-section selecting for selecting an arm section to be used for actually grasping the object on the basis of the index value of the grasping easiness calculated for each of the arm sections.

According to another embodiment of the present disclosure, there is provided a computer program, described in a computer-readable format, for causing a computer to function as an apparatus, the apparatus including: a grasping-easiness calculation section configured to calculate an index value of grasping easiness quantitatively evaluating easiness of assuming a grasping posture for grasping an object or assuming a transition posture leading to the grasping posture for each of a plurality of arm sections; and an arm-section selection section configured to select an arm section to be used for actually grasping the object on the basis of the index value of the grasping easiness calculated for each of the arm sections.

The computer program described above is a computer program defined in a computer-readable format such that predetermined processing is achieved on a computer. To put it in another way, by installing the above-described computer program on a computer, cooperative operation is performed on a computer. Accordingly, it is possible to obtain a same working effect as that of the robot apparatus described above.

By the technique disclosed in this specification, it is possible to provide an excellent robot apparatus capable of suitably determining which of a plurality of arm sections is used for operation when there is an object in various circumstances, a method of controlling the robot apparatus, and a computer program.

By the technique disclosed in this specification, it is possible to provide an excellent robot apparatus capable of selecting an arm section that grasps an object most easily from a plurality of arm sections in accordance with environmental circumstances and an own body state, and capable of carrying out a stable grasping task in a more varied environments, a method of controlling the robot apparatus, and a computer program.

By the technique disclosed in this specification, by determining which arm section is actually used for grasping on the basis of a grasping easiness index at the time of grasping an object by each of the arm sections, it is possible to grasp an object with a natural arm-section posture.

Also, by the technique disclosed in this specification, when a grasping point is determined at the time of grasping by an arm section, an arm section posture is determined with respect to a hand position posture at the time of grasping an object at that grasping point using inverse kinematics. And it is possible to use a quantitative evaluation value of grasping easiness of the arm section assuming the posture as a grasping easiness index of the arm section. Specifically, it is possible to give a quantitative evaluation to grasping easiness on the basis of manipulability at the time of assuming a determined arm-section posture, a joint distance from joint rang-of-motion of an arm section joint, and a shortest distance between an arm section, and a surrounding environment and an own body.

Further, the other objects, features, and advantages of the technique disclosed in this specification will become apparent by a detailed description on the basis of an embodiment described below and the accompanying drawings.

DETAILED DESCRIPTION OF EMBODIMENT

In the following, a detailed description will be given of an embodiment of the technique disclosed in this specification with reference to the drawings.

Figure 1:
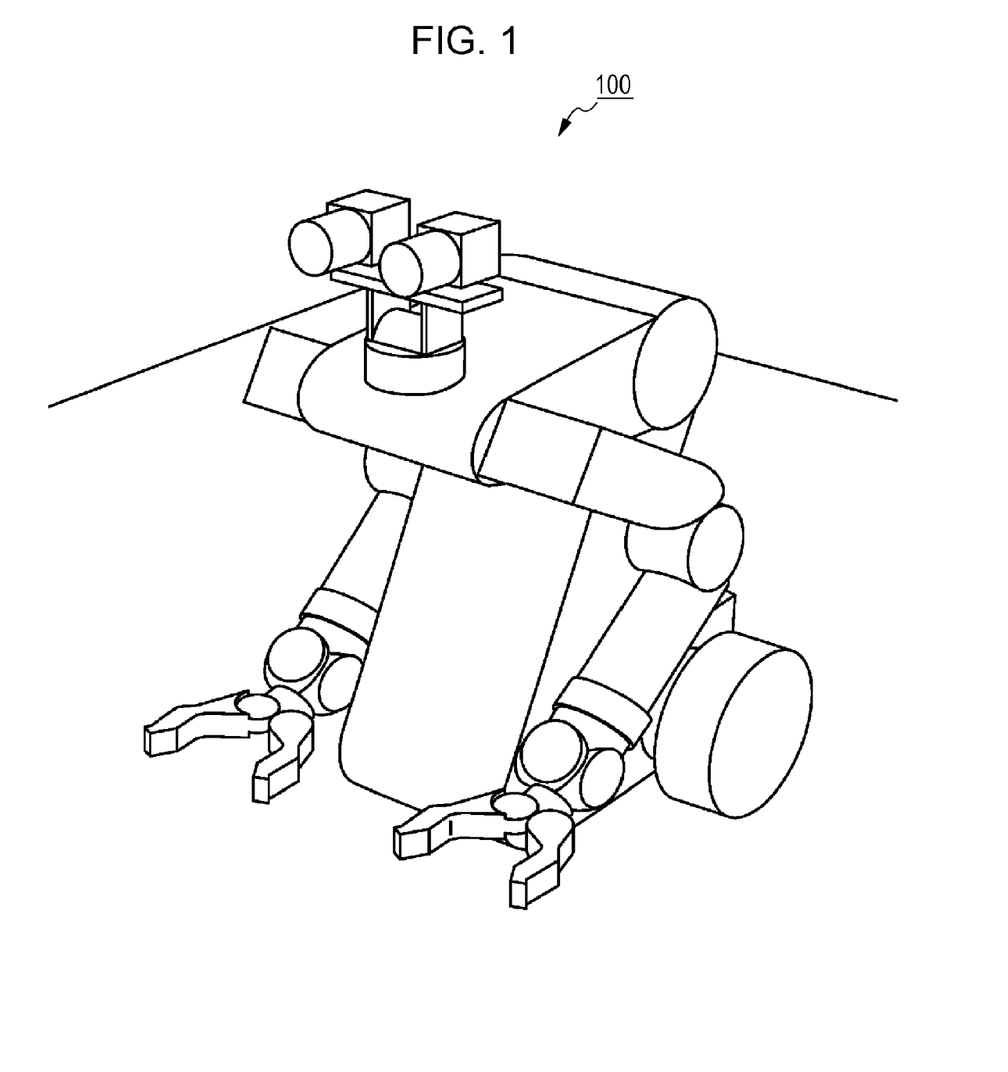
FIG. 1 is a diagram illustrating an outer view of a robot apparatus to which a technique disclosed in this specification can be applied.
Figure 2:
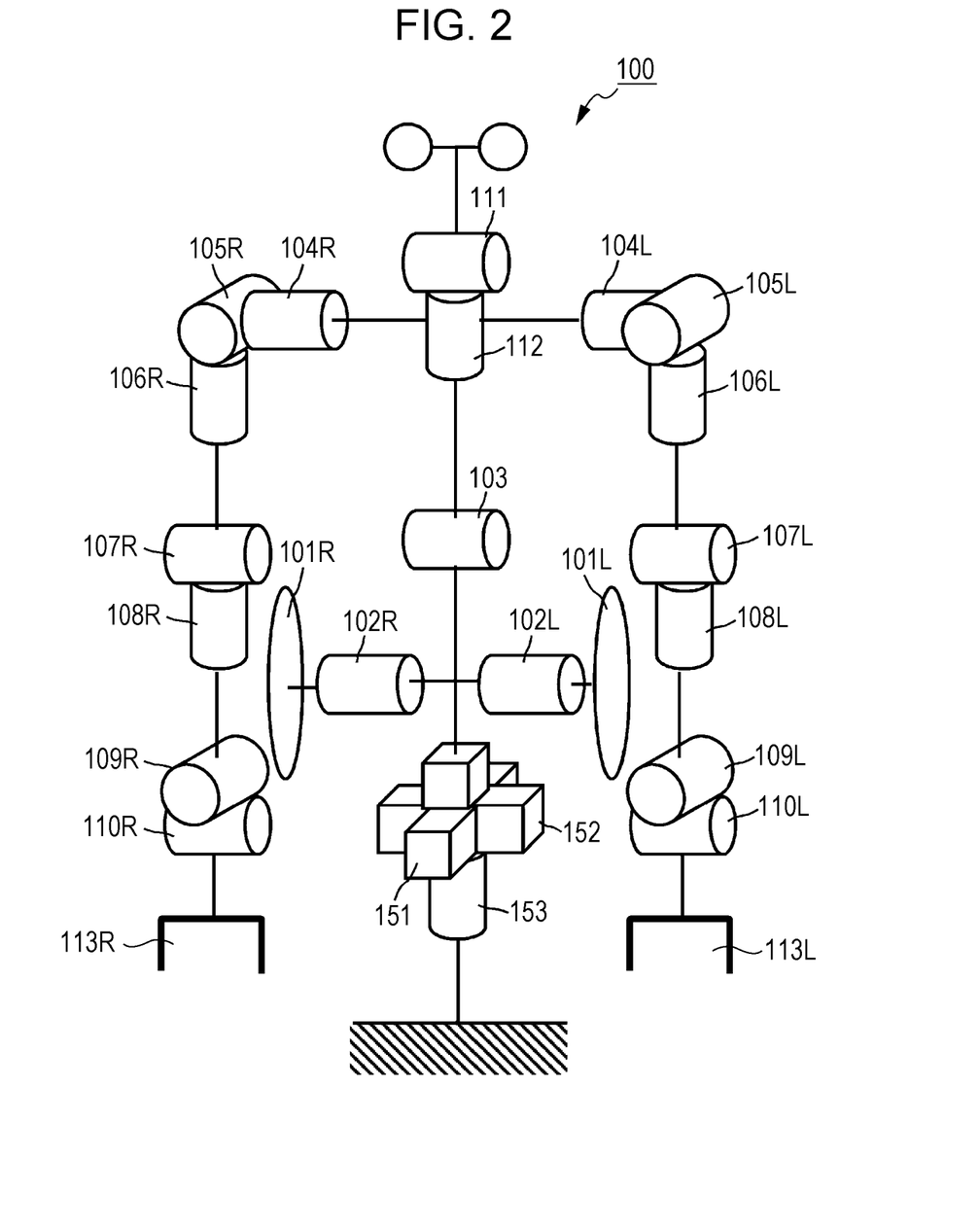
FIG. 2 is a diagram schematically illustrating a configuration of degrees of freedom in joints of the robot apparatus to which a technique disclosed in this specification can be applied.

FIG. 1 illustrates an outer view of a robot apparatus 100 to which the technique disclosed in this specification can be applied. The robot apparatus 100 has a link structure in which a plurality of links are connected by joints, and the individual joints are operated by actuators, respectively. Also, FIG. 2 schematically illustrates a configuration of degrees of freedom in joints of the robot apparatus 100. The robot apparatus 100 illustrated in FIG. 1 and FIG. 2 is installed in a surrounding environment that is dynamically changing every moment, such as in a home, etc., and performs life support, such as household chores, nursing care, etc. However, it is also possible for the robot apparatus 100 to be installed in a factory, etc., and to carry out a fixed task.

The robot apparatus 100 illustrated in FIG. 1 and FIG. 2 is a dual-arm type, and is provided with two driving wheels 101R and 101L that are opposed to each other in a base section as a moving means. The driving wheels 101R and 101L are driven by driving wheel actuators 102R and 102L that individually rotate around a pitch axis, respectively. In this regard, in FIG. 2, reference numerals 151, 152, 153 are underactuated joints that do not actually exist, and correspond to a translational degree of freedom in an X direction (forward and backward directions), a translational degree of freedom in a Y direction (right and left directions), and a rotational degree of freedom around a yaw axis, respectively, of the robot apparatus 100 with respect to a floor face, thereby representing movement of the robot apparatus 100 in a virtual world.

The moving means is connected to an upper body through a waist joint. The moving means is driven by a waist-joint pitch axis actuator 103 that rotates around a pitch axis. The upper body includes two, right and left, arm sections and a head section connected through a neck joint. Each of the right and the left arm sections has three degrees of freedom at the shoulder joint, two degrees of freedom at an elbow joint, and two degrees of freedom at a wrist joint, and thus seven degrees of freedom in total. The three degrees of freedom at a shoulder joint are driven by shoulder-joint pitch axis actuators 104R/L, shoulder-joint roll axis actuators 105R/L, and shoulder-joint yaw axis actuators 106R/L. The two degrees of freedom at the elbow joint are driven by elbow-joint pitch axis actuators 107R/L and elbow-joint yaw axis actuators 108R/L. The two degrees of freedom at the wrist joint are driven by wrist-joint roll axis actuators 109R/L and wrist-joint pitch axis actuators 110R/L. Also, the two degrees of freedom at the neck joint are driven by a neck-joint pitch axis actuator 111 and a neck-joint roll axis actuator 112. Also, one degree of freedom at each hand joint is driven by a corresponding one of hand-joint roll axis actuators 113R/L.

In this regard, although the robot apparatus 100 illustrated in FIG. 1 and FIG. 2 is provided with a moving means having opposed two wheels, the gist of the technique disclosed in this specification is not limited to a moving means having opposed two wheels. For example, it is also possible to apply the technique disclosed in this specification to a robot apparatus 100 provided with a moving means having legs in the same manner.

An encoder for measuring a joint angle, a motor for generating torque, a current-controlled type motor driver for driving the motor, and a reduction gear for obtaining sufficient generated force are attached to an actuator of each axis. Also, each actuator is provided with a microcomputer that performs drive control of the actuator (both are not illustrated in FIG. 2).

Dynamics computing of the robot apparatus 100 is performed on a host computer, and control target values of torque or joint angles of the individual actuators are generated. The control target values are transmitted to the control microcomputer provided to the actuators, and used for controlling the actuators performed by the control microcomputers, respectively. Also, the individual joint actuators are controlled by a force control method or a position control method.

Figure 3:
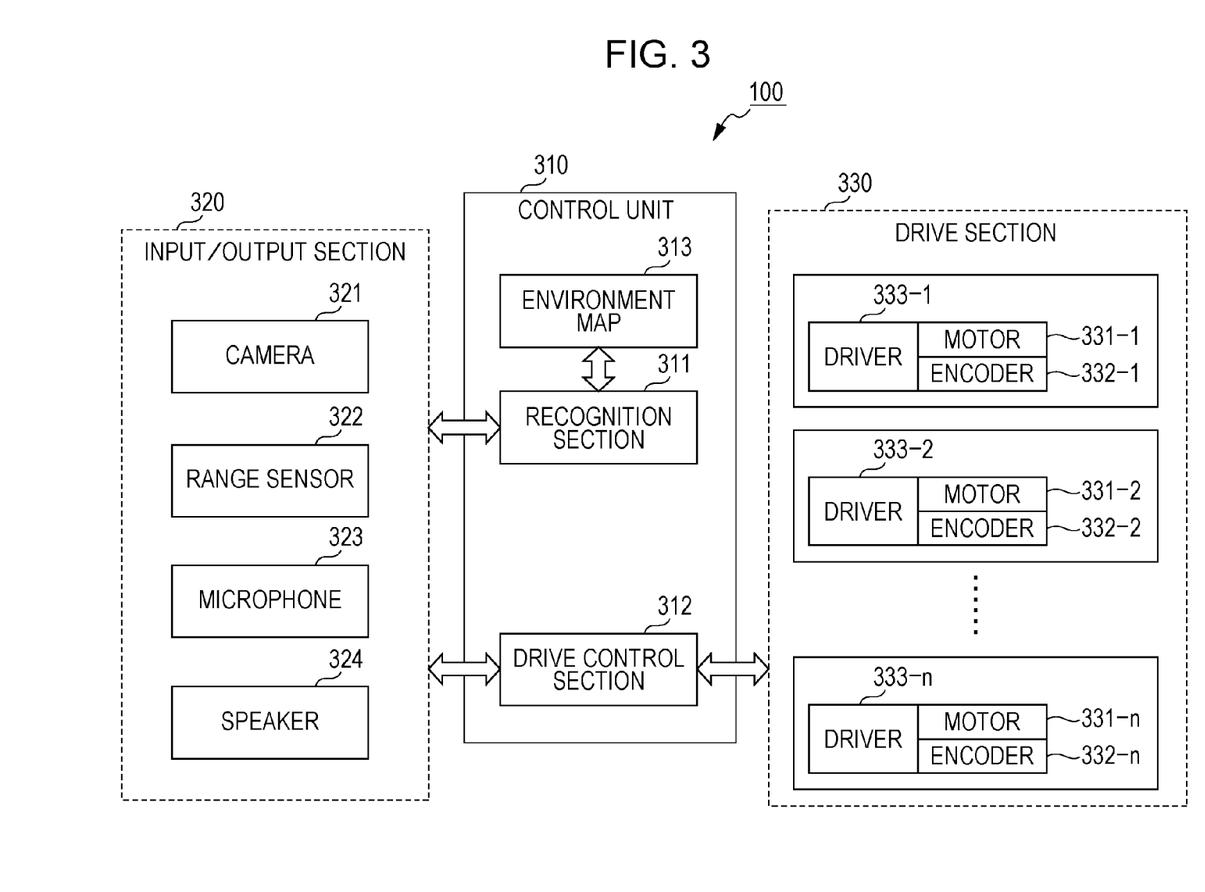
FIG. 3 is a diagram schematically illustrating a functional configuration for controlling the robot apparatus illustrated in FIG. 1.

FIG. 3 schematically illustrates a functional configuration for controlling the robot apparatus 100 illustrated in FIG. 1. The robot apparatus 100 includes a control unit 310, which performs overall control of entire operation and the other data processing, an input/output section 320, and a drive section 330. In the following, descriptions will be given of the individual sections.

The input/output section 320 includes a camera 321 and a range sensor 322 corresponding to eyes of the robot apparatus 100 as an input section, and a microphone 323 corresponding to ears of the robot apparatus 100, etc. Also, the input/output section 320 includes a speaker 324 corresponding to a mouth of the robot apparatus 100 as an output section, etc. Here, the range sensor 322 includes a spatial sensor, for example, a laser range finder, etc. It is possible to measure a three-dimensional shape, a position, and a posture of an object to be grasped by an arm section using the camera 321 and the range sensor 322. Also, the robot apparatus 100 is allowed to receive an instruction of a task, for example, by audio input of a user from the microphone 323. However, the robot apparatus 100 may include an input means (not illustrated in the figure) of an instruction of the other tasks through a wired connection, a wireless connection, or through a recording medium, etc.

The drive section 330 is a functional module for achieving degrees of freedom at each joint of the robot apparatus 100, and includes a plurality of drive units disposed for each axis, such as a roll axis, a pitch axis, and a yaw axis, etc., at the individual joints. Each of the drive units includes a combination of a motor 331 performing rotational operation around a predetermined axis, an encoder 332 detecting a rotational position of the motor 331, and a driver 333 adaptively controlling a rotational position and a rotational velocity of the motor 331 on the basis of an output of the velocity encoder 332.

The control unit 310 includes a recognition section 311, a drive control section 312, and an environment map 313.

The recognition section 311 recognizes a surrounding environment on the basis of information obtained from the input section, such as the camera 321 and the range sensor 322 in the input/output section 320. For example, the recognition section 311 builds and updates the environment map 313 on the basis of input information in advance.

The drive control section 312 controls the output section out of the input/output section 320, and driving of the drive section 330. For example, the drive control section 312 performs control of the drive section 330 in order for the robot apparatus 100 to achieve tasks. The tasks achieved by the robot apparatus 100, mentioned here, include household chores and nursing care in accordance with instructions from the user and operation in response to an environment, etc.

Figure 4:
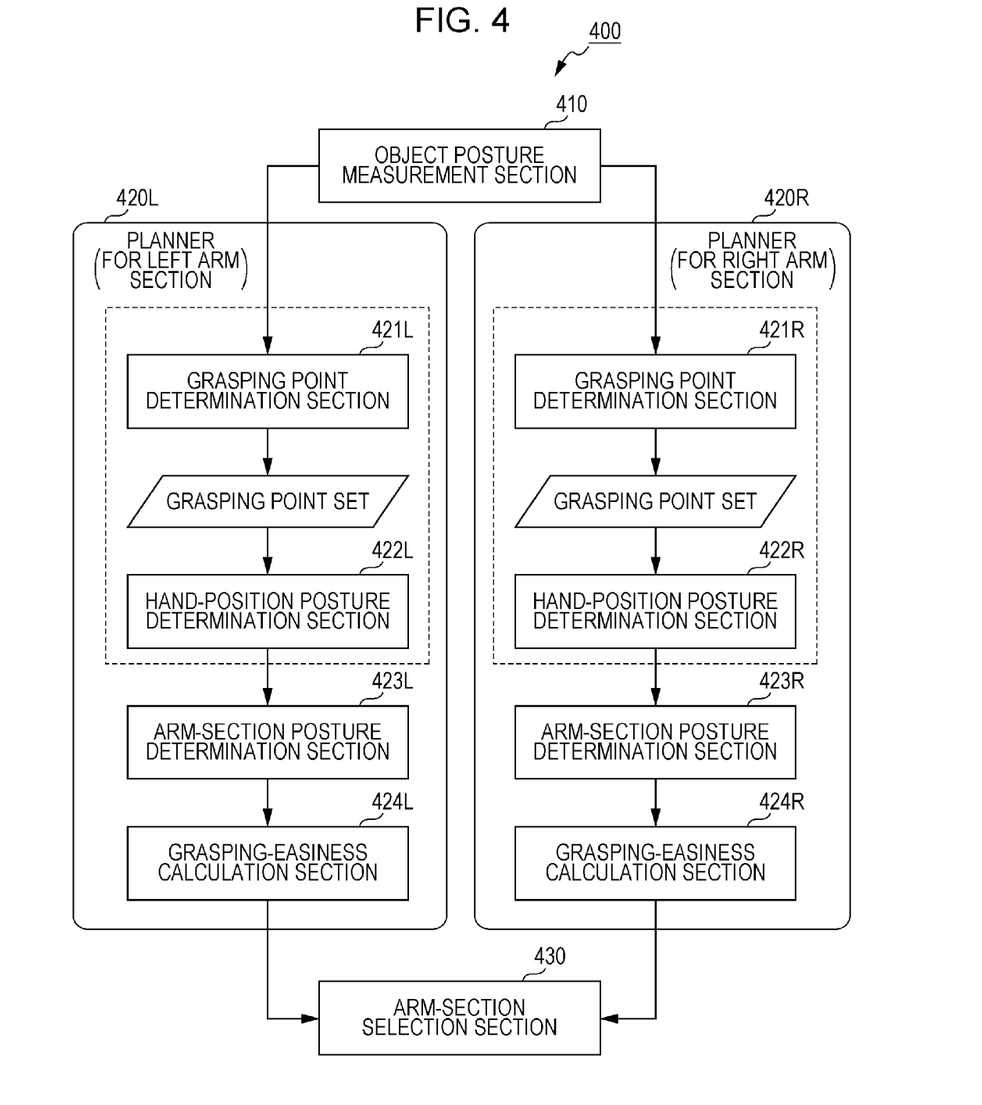
FIG. 4 is a diagram illustrating an example of a configuration of a planning processing system for grasping an object using right and left arm sections.

A consideration will be given to cases where an object is operated by the dual-arm robot apparatus 100 illustrated in FIG. 1 to FIG. 3 in various circumstances. FIG. 4 illustrates an example of a configuration of a planning processing system 400 for grasping an object using right and left arm sections. The planning processing section 400 illustrated in FIG. 4 includes a object posture measurement section 410, planners 420L/R for left and right arm sections, and arm-section selection section 430. The planning processing section 400 is achieved, for example, by performing predetermined program code on a computer installed in the robot apparatus 100 or outside the robot apparatus 100.

The object posture measurement section 410 measures a three-dimensional shape, a position, and a posture of an object using the camera 321 and the range sensor 322.

The left and right planners 420L/R include grasping point determination sections 421L/R and hand-position posture determination sections 422L/R, respectively.

The grasping point determination sections 421L/R plan which part of the object ought to be grasped when the object is grasped by the respective arm section, and output a grasping point set as a processing result.

When each of the arm sections grasps an object at grasping point set determined by a corresponding one of the grasping point determination section 421L/R, each of the hand-position posture determination sections 422L/R determines how each of the arm sections approaches so that what position and posture a corresponding hand ought to assume for the object in consideration of a hand structure.

In this regard, grasping point determination processing and hand-position posture determination processing that are surrounded by broken lines in FIG. 4 are closely related to each other in reality. As illustrated in FIG. 4, it is thought that the grasping point determination processing and the hand-position posture determination processing are not performed independently, but are configured to be determined at the same time. For details on the grasping point determination processing and the hand-position posture determination processing, for example, refer to Andrew T. Miller, Steffen Knoop, Peter K. Allen, Henrik I. Chrostensen, "Automatic Grasp Planning Using Shape Primitives," (In Proceedings of IEEE International Conference on Robotics and Automation, pp. 1824-1829, 2003).

A plan for moving a hand to a position and a posture determined by each of the hand-position posture determination sections 422L/R is carried out. And each of the arm-section posture determination sections 423L/R determines an arm section posture, that is to say, arm joint values at each time during the transition using inverse kinematics (common knowledge).

In this manner, a position and a posture of the arm section for grasping an object by a hand is determined for each arm. In the case of the robot apparatus 100 having a plurality of arm sections as illustrated in FIG. 1, further, it becomes necessary to perform processing of determining which of the arm sections is used for grasping the object.

In the present embodiment, a corresponding one of the planners 420L/R for each arm section determines a posture of an arm section for grasping an object by each hand, and then a corresponding one of the grasping-easiness calculation sections 423L/R performs quantitative evaluation on easiness of assuming the determined arm section posture. The value of the quantitative evaluation is used as an index for determining grasping easiness for each arm section. And the arm-section selection section 430 selects an arm section to actually grasp an object on the basis of a grasping easiness index having been subjected to the quantitative evaluation.

It is possible for the grasping-easiness calculation sections 423L/R to give manipulability, joint range-of-motion, and interference possibility with environment as a quantitative evaluation index for calculating grasping easiness. In the following, a description will be given of a method of determining an arm section on the basis of each quantitative evaluation index.

(1) Determination on the Basis of Manipulability

It is possible to say that "easy to grasp" means not assuming an unnatural posture of an arm section. As an index for quantifying whether an arm section is assuming an unnatural posture or not, it is possible to give manipulability. For details on manipulability, for example, refer to Yoshikawa Tsuneo, "Manipulability of Robot Arm" (Journal of the Robotics Society of Japan, Vol. 2, No. 1, pp. 63-67, 1984).

A linear relation represented by the following Expression 1 holds for a translational speed, an angular velocity of a hand, and a joint velocity.

$$\begin{pmatrix} \dot{x} \\ \omega \end{pmatrix} = J(q)\dot{q} \qquad (1)$$

$\dot{x}$: hand translational speed
$\omega$: hand angular velocity
q: joint angle
$\dot{q}$: joint velocity In Expression (1), J(q) is Jacobian, and is a nonlinear function of a joint angle q.

Assuming that singular values of the Jacobian J are $\sigma_1, \sigma_2, \ldots \sigma_n$, a manipulability w is defined by Expression (2) as follows.

$$w = \sigma_1 \sigma_2 \ldots \sigma_n \qquad (2)$$

It can be said that the larger the manipulability w is, the hand of that arm section is easier to be operated, and thus is the easier posture. It is possible for a corresponding one of the arm-section posture determination sections 423L/R of each of the arm sections to obtain a joint value q in a state of grasping an object. Each of the grasping-easiness calculation sections 424L/R calculates Jacobian J(q) for the value q, and calculates a manipulability w from the singular values. Thereby, it is possible to use the value w as a grasping easiness index.

In this regard, if the computer has sufficient power, it is possible to calculate not only the joint value q in a state of grasping the object, but also manipulabilities w for all the postures while the hand is moving. Thereby, it is possible to use a minimum value during the moving as a grasping easiness index.

(2) Determination on the Basis of Joint Range-of-Motion

Figure 5:
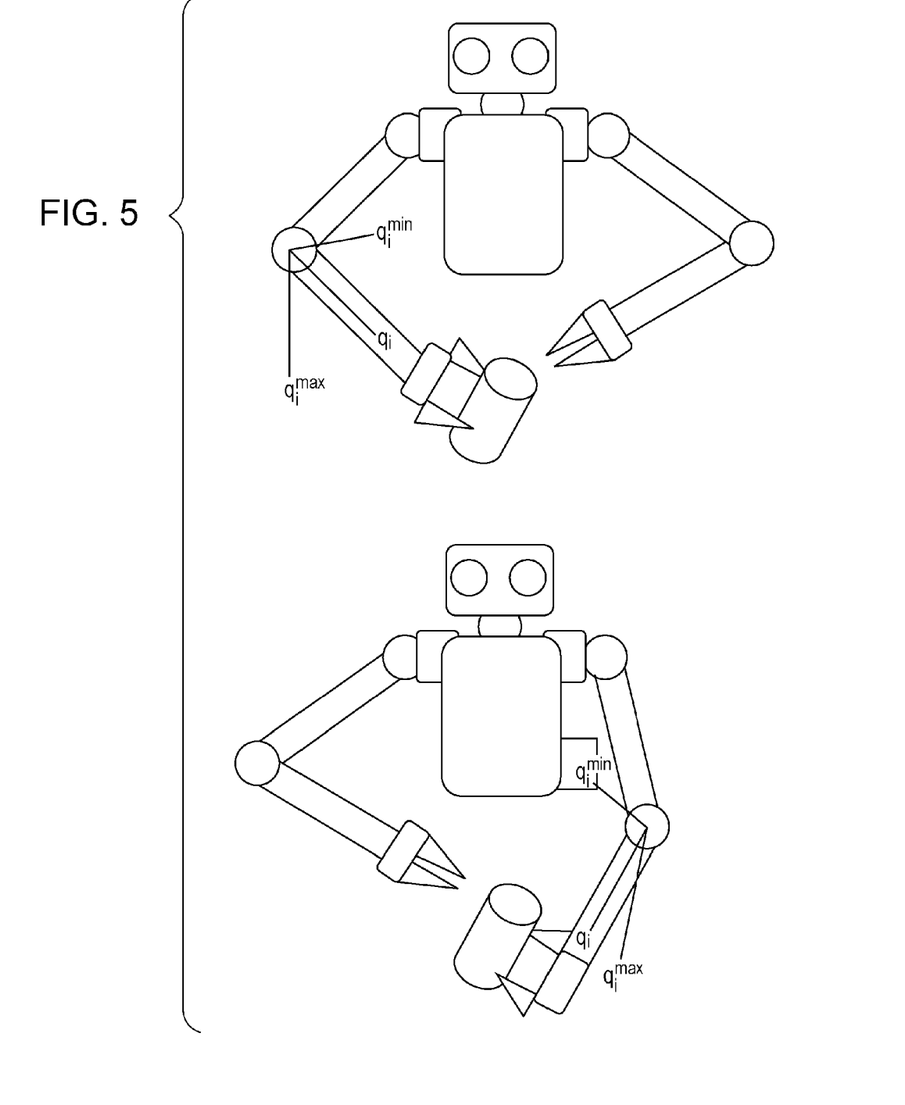
FIG. 5 is a diagram illustrating states in which an object located at a same position is grasped by a right arm hand and a left arm hand, respectively.

A joint has a range-of-motion limit. It is difficult to say that an arm posture that is close to a limit zone is an easy posture. FIG. 5 illustrates states in which an object located at a same position is grasped by a right arm hand and a left arm hand, respectively. As illustrated by an upper side in FIG. 5, when an object is grasped by a hand of the right arm, a joint angle $q_i$ of an elbow joint has a joint distance that is apart from a minimum value $q_i^{min}$ and a maximum value $q_i^{max}$ of the range-of-motion limit. Accordingly, it can be said that grasping the object by the right arm hand is an easy posture. On the other hand, as illustrated by a lower side in FIG. 5, when an object is grasped by a hand of the left arm, although the joint angle $q_i$ of the elbow joint has a joint distance that is apart from the minimum value $q_i^{min}$ of the range-of-motion limit, it is close to the maximum value $q_i^{max}$. Accordingly, it is difficult to say that grasping the object by the left arm hand is an easy posture.

Here, if it is assumed that a range of motion of the i-th joint of an arm section is [$q_i^{min}$, $q_i^{max}$], a joint distance $d_i$ to a range-of-motion limit of a joint i is represented by Expression (3) as follows.

$$d_i = \min(|q_i - q_i^{min}|, |q_i - q_i^{max}|) \qquad (3)$$

If a range-of-motion limit margin of a whole system is expressed by a joint distance d as far as a joint range-of-motion limit that is closest to a range-of-motion limit of all the arm joints, Expression (4) is obtained as follows.

$$d_i = \min_i(d_i) \qquad (4)$$

The arm-section posture determination section 423L/R of each arm section can obtain a joint value q in a state of grasping an object. The grasping-easiness calculation section 424L/R calculates, for the value q, a range-of-motion limit margin of all the arm sections, that is to say, a joint distance d from the joint range-of-motion, and can use this as a grasping easiness index.

In this regard, if the computer has sufficient power, it is possible to calculate not only the joint value q in a state of grasping the object, but also joint distance d for all the postures while the hand is moving. Thereby, it is possible to use a minimum value during the moving as a grasping easiness index.

(3) Determination on the Basis of Interference Possibility With Environment

An arm section posture in which an arm section do not cause interference with the environment and the own body is a preferable posture as a grasping strategy. It is possible to obtain an environment shape from map information in the environment map 313 and the range sensor 322. Also, if an own body model of the robot apparatus 100 is possessed, it is possible to use interference possibilities between the arm section, and the own body (a body part other than the arm section) and the environment as grasping easiness indexes.

Figure 6:
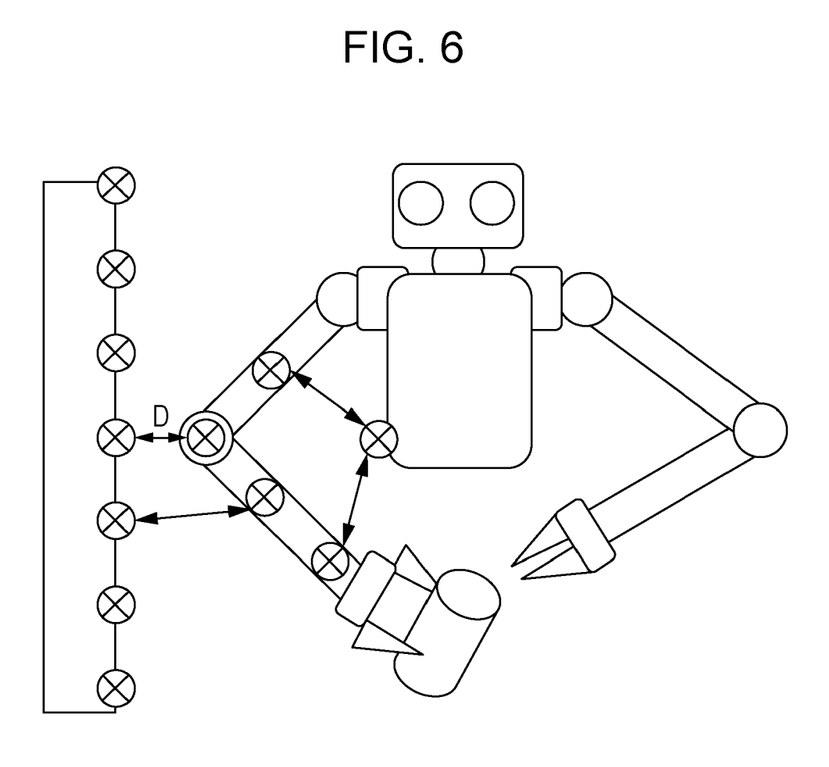
FIG. 6 is a diagram illustrating a state in which collision detection points are provided at several places, such as an arm section, an environment, and on an own body, and interference possibility is determined.

For example, as illustrated in FIG. 6, collision detection points are disposed at several places on the arm section, the surrounding environment, and the own body. The arm-section posture determination section 423L/R of each arm section can obtain the joint value q in a state of grasping an object. And the grasping-easiness calculation section 424L/R evaluates shortest distances between an arm section solid body and the surrounding environment, and the own body in a state of grasping the object, and thereby can determine interference possibilities.

In this regard, if the computer has sufficient power, a pair of nearest neighboring points among solid bodies representing the arm section, the own body, and an environment is obtained using a GJK (Gilbert-Johnson-Keerthi) algorithm, and the distance D ought to be obtained.

$$D = \min_{i,j}(\text{distance}(body_a(i), body_e(j))) \qquad (5)$$

In Expression (5), $body_a(i)$ represents a solid body i constituting an arm section, and $body_e(j)$ represents a solid body j constituting the environment and the own body. For example, Japanese Patent No. 4311391, which has already been assigned to the present applicants, has disclosed a method of detecting contact among solid bodies representing an arm section of a robot apparatus, an own body, and an environment using a GJK algorithm.

In this regard, if the computer has sufficient power, it is possible to calculate not only a state of grasping the object, but also distances d for all the postures while the hand is moving. Thereby, it is possible to use a minimum value during the moving as a grasping easiness index.

It is also possible for the grasping-easiness calculation section 424L/R to merge two indexes or more of the above-described manipulability, joint range-of-motion, and interference possibility with the surrounding environment into a grasping easiness index instead of using any one of them as a grasping easiness index. That is to say, the grasping easiness index can be expressed by Expression (6) as follows.

$$\text{Grasping easiness index} = r_1 w + r_2 d + r_3 D \tag{6}$$

In Expression 6, $r_1$, $r_2$, and $r_3$ are weighting factors to be given to the corresponding indexes of the manipulability w, the joint range-of-motion d, and the interference possibility D with the environment.

And the arm-section selection section 430 compares the grasping-easiness index values that have been calculated by the grasping-easiness calculation sections 424L/R in the planners 420L/R of the left and the right arm sections, respectively, and selects a larger one as an arm section for actually grasping the object.

As described above, by the present embodiment, it is possible for the robot apparatus 100 to select an arm section that grasps an object most easily from a plurality of arm sections in accordance with environmental circumstances and an own body state, and to carry out a stable grasping task in a more various environments.

In this regard, the technique disclosed in this specification can also be configured as follows.

(1) A robot apparatus including: a plurality of arm sections; a grasping-easiness calculation section configured to calculate an index value of grasping easiness quantitatively evaluating easiness of assuming a grasping posture for grasping an object or assuming a transition posture leading to the grasping posture for each of the plurality of arm sections; and an arm-section selection section configured to select an arm section to be used for actually grasping the object on the basis of the index value of the grasping easiness calculated for each of the arm sections.

(2) The robot apparatus according to (1), further including: a grasping planning section configured to determine a grasping point at the time of grasping the object with an arm section and a hand position posture at the time of grasping the object at the grasping point for each of the arm sections; and an arm-section posture determination section configured to determine a posture of the arm section with respect to the determined hand position posture, wherein the grasping-easiness calculation section quantitatively evaluates easiness of assuming a posture determined by the arm-section posture determination section.

(3) The robot apparatus according to (1), wherein the grasping-easiness calculation section calculates the index value of the grasping easiness on the basis of manipulability of the arm section in a grasping posture for grasping the object or a transition posture leading to the grasping posture for each of the plurality of arm sections.

(4) The robot apparatus according to (1), wherein the grasping-easiness calculation section calculates the index value of the grasping easiness on the basis of a joint distance from a joint range-of-motion limit of a joint of the arm section in a grasping posture for grasping the object or a transition posture leading to the grasping posture for each of the plurality of arm sections.

(5) The robot apparatus according to (1), wherein the grasping-easiness calculation section calculates the index value of the grasping easiness on the basis of shortest distances between the arm section and a surrounding environment, and the arm section and an own body in a grasping posture for grasping the object or a transition posture leading to the grasping posture for each of the plurality of arm sections.

(6) The robot apparatus according to (1), wherein the grasping-easiness calculation section calculates the index value of the grasping easiness on the basis of a combination of at least two of manipulability of the arm section, a joint distance from a joint range-of-motion limit of a joint of the arm section, and shortest distances between the arm section and a surrounding environment, and the arm section and an own body in a grasping posture for grasping the object or a transition posture leading to the grasping posture for each of the plurality of arm sections.

(7) A method of controlling a robot, the method including: grasping-easiness calculating for calculating an index value of grasping easiness quantitatively evaluating easiness of assuming a grasping posture for grasping an object or assuming a transition posture leading to the grasping posture for each of a plurality of arm sections; and an arm-section selecting for selecting an arm section to be used for actually grasping the object on the basis of the index value of the grasping easiness calculated for each of the arm sections.

(8) A computer program, described in a computer-readable format, for causing a computer to function as an apparatus, the apparatus including: a grasping-easiness calculation section configured to calculate an index value of grasping easiness quantitatively evaluating easiness of assuming a grasping posture for grasping an object or assuming a transition posture leading to the grasping posture for each of a plurality of arm sections; and an arm-section selection section configured to select an arm section to be used for actually grasping the object on the basis of the index value of the grasping easiness calculated for each of the arm sections.

In the above, the detailed description has been given of the technique disclosed in this specification with reference to the specific embodiment. However, it is apparent that modifications and substitutions of the embodiment may be made by those skilled in the art without departing from the spirit and scope of the technique disclosed in the present specification.

In this specification, the description has been given of an embodiment assumed to be applied to a life support robot that is engaged in activities in our living environment, which is dynamically changing every moment. However, the gist of the technique disclosed in this specification is not limited to this. Of course, it is possible to apply the technique disclosed in this specification in the same manner to an industrial robot that is installed in a factory, and whose tasks to be performed by each arm section are understood in advance.

Also, in this specification, a description has been given with a central focus on the embodiment applied to a dual-arm type robot apparatus. However, the gist of the technique disclosed in this specification is not limited by the number of arm sections. If a robot apparatus has three arm sections or more, it is possible to achieve the technique disclosed in this specification in the same manner by increasing the number of planners in accordance with the number of arm sections.

In short, a description has been given of the technique disclosed in this specification by exemplification. However, the description of this specification should not be construed in a limited manner. In order to determine the gist of the technique disclosed in this specification, the appended claims should be considered.

The present disclosure contains subject matter related to that disclosed in Japanese Priority Patent Application JP 2011-262202 filed in the Japan Patent Office on Nov. 30, 2011, the entire contents of which are hereby incorporated by reference.

What is claimed is:

1. A robot apparatus comprising:
a plurality of arm sections;
one or more processors configured to:
determine a grasping point and a hand position posture for grasping an object at the grasping point for each of the plurality of arm sections;
determine an arm position posture for each of the plurality of arm sections, wherein the arm position posture is determined based at least in part on the determined hand position posture;
calculate an index value of a grasping easiness for each of the plurality of arm sections,
wherein the index value of the grasping easiness is calculated by quantitatively evaluating easiness of assuming the determined arm position posture and the determined hand position posture for grasping the object or assuming a transition posture leading to the determined hand position posture for each of the plurality of arm sections;
select one of the plurality of arm sections for grasping the object on the basis of the calculated index value of the grasping easiness; and
grasp the object by said selected arm section.

2. The robot apparatus according to claim 1, wherein the one or more processors are further configured to:
determine the grasping point at the time of grasping the object determine the hand position posture at the time of grasping the object at the grasping point for each of the arm sections; and
determine a grasping posture for each of the plurality of arm sections with respect to the determined hand position posture,
wherein the index value of the grasping easiness is calculated by quantitatively evaluating easiness of assuming the determined grasping posture for each of the plurality of arm sections.

3. The robot apparatus according to claim 1, wherein the one or more processors are further configured to calculate the index value of the grasping easiness on the basis of manipulability of each of the plurality of arm sections in a grasping posture for grasping the object or the transition posture leading to the grasping posture for each of the plurality of arm sections.

4. The robot apparatus according to claim 1, wherein the one or more processors are further configured to calculate the index value of the grasping easiness on the basis of a joint distance from a joint range-of-motion limit of a joint of each of the plurality of arm sections in a grasping posture for grasping the object or the transition posture leading to the grasping posture for each of the plurality of arm sections.

5. The robot apparatus according to claim 1, wherein the one or more processors are further configured to calculate the index value of the grasping easiness on the basis of shortest distances between each of the plurality of arm sections and a surrounding environment, and each of the plurality of arm sections and an own body in a grasping posture for grasping the object or the transition posture leading to the grasping posture for each of the plurality of arm sections.

6. The robot apparatus according to claim 1, wherein the one or more processors are configured to calculate the index value of the grasping easiness on the basis of a combination of at least two of:
manipulability of each of the plurality of arm sections,
a joint distance from a joint range-of-motion limit of a joint of each of the plurality of arm sections, and
shortest distances between each of the plurality of arm sections and a surrounding environment, and each of the plurality of arm sections and an own body in a grasping posture for grasping the object or the transition posture leading to the grasping posture for each of the plurality of arm sections.

7. The robot apparatus according to claim 1, wherein the one or more processors for determining the arm position posture are further configured to:
determine arm joint values at each time in assuming the determined hand position posture for grasping the object or assuming the transition posture leading to the determined hand position posture.

8. The robot apparatus according to claim 1, wherein the one or more processors for determining the arm position posture are further configured to:
calculate a joint distance from a joint range-of-motion limit of a joint for each of the plurality of arm sections in a grasping posture for grasping the object or the transition posture leading to the grasping posture,
wherein the joint distance is the minimum of a first positive value and a second positive value, where the first positive value is obtained by subtraction of a joint angle and the minimum value of the joint angle and where the second positive value is obtained by subtraction of the joint angle and the maximum value of the joint angle, and
wherein the index value of the grasping easiness is at least partially calculated on the basis of the joint distance for each of the plurality of arm sections.

9. A method of controlling a robot, the method comprising:
in one or more processors:
determining a grasping point and a hand position posture for grasping an object at the grasping point for each of a plurality of arm sections;
determining an arm position posture for each of the plurality of arm sections, wherein the arm position posture is determined based at least in part on the determined hand position posture;
calculating an index value of a grasping easiness for each of the plurality of arm sections,
wherein the index value of the grasping easiness is calculated by quantitatively evaluating easiness of assuming the determined arm position posture and the determined hand position posture for grasping the object or assuming a transition posture leading to the determined hand position posture for each of the plurality of arm sections;
selecting one of the plurality of arm section sections for grasping the object on the basis of the calculated index value of the grasping easiness; and
grasping the object by said selected arm section.

10. A non-transitory computer readable medium having stored thereon, a set of computer-executable instructions, for causing a computer to perform steps comprising:
determining a grasping point and a hand position posture for grasping an object at the grasping point for each of a plurality of arm sections;
determining an arm position posture for each of the plurality of arm sections, wherein the arm position posture is determined based at least in part on the determined hand position posture;

calculating an index value of a grasping easiness for each of the plurality of arm sections,
wherein the index value of the grasping easiness is calculated by quantitatively evaluating easiness of assuming the determined arm position posture and the determined hand position posture for grasping the object or assuming a transition posture leading to the determined hand position posture for each of the plurality of arm sections;
selecting one of the plurality of arm sections for grasping the object on the basis of the calculated index value of the grasping easiness; and
grasping the object by said selected arm section.

* * * * *